United States Patent
Kahn et al.

(10) Patent No.: US 11,643,486 B1
(45) Date of Patent: May 9, 2023

(54) NON-LINEAR VINYLIDENE FLUORIDE COPOLYMERS

(71) Applicant: Arkema Inc., King of Prussia, PA (US)

(72) Inventors: Andrew P. Kahn, King of Prussia, PA (US); James T. Goldbach, King of Prussia, PA (US); Daniel B. Kent, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/978,393

(22) Filed: Nov. 1, 2022

Related U.S. Application Data

(60) Provisional application No. 63/350,029, filed on Jun. 8, 2022.

(51) Int. Cl.
*C08F 214/22* (2006.01)
*H01M 4/62* (2006.01)

(52) U.S. Cl.
CPC ......... *C08F 214/225* (2013.01); *H01M 4/623* (2013.01)

(58) Field of Classification Search
None
See application file for complete search history.

(56) References Cited

U.S. PATENT DOCUMENTS

| | | | |
|---|---|---|---|
| 8,337,725 B2 | 12/2012 | Abusleme et al. | |
| 10,079,388 B2 | 9/2018 | Stanga et al. | |
| 2013/0267622 A1* | 10/2013 | Abusleme | C08F 290/10 |
| | | | 525/54.3 |
| 2014/0316147 A1 | 10/2014 | Haubs et al. | |
| 2014/0323686 A1 | 10/2014 | Kurz et al. | |
| 2014/0329988 A1 | 11/2014 | Haubs et al. | |
| 2014/0343300 A1 | 11/2014 | Haubs et al. | |
| 2014/0343301 A1 | 11/2014 | Haubs et al. | |
| 2014/0343302 A1 | 11/2014 | Haubs et al. | |
| 2015/0038633 A1* | 2/2015 | Shibutani | C08L 27/18 |
| | | | 524/503 |
| 2015/0104691 A1* | 4/2015 | Nakamura | H01M 10/0525 |
| | | | 429/150 |
| 2017/0015772 A1* | 1/2017 | Watanabe | C08F 214/22 |
| 2018/0076444 A1 | 3/2018 | Chauveau et al. | |
| 2019/0326602 A1 | 10/2019 | Aoki et al. | |
| 2020/0373560 A1 | 11/2020 | Campbell et al. | |
| 2021/0047448 A1 | 2/2021 | Aoki et al. | |
| 2021/0328226 A1* | 10/2021 | Mourzagh | H01M 10/0413 |

FOREIGN PATENT DOCUMENTS

| | | | |
|---|---|---|---|
| JP | 2019160651 A2 | 9/2019 | |
| WO | WO 2011/122260 | * 10/2011 | |
| WO | WO18092675 A1 | 5/2018 | |

OTHER PUBLICATIONS

Di-n-propyl peroxydicarbonate, available at http://www.industrialchemistry.org/PDF/r10455.pdf, date unknown.*
Diisopropyl peroxydicarbonate, available at https://www.chemicalbook.com/ChemicalProductProperty_EN_CB2851684.htm, date unknown.*

* cited by examiner

Primary Examiner — Anca Eoff
(74) Attorney, Agent, or Firm — Joanne Rossi

(57) ABSTRACT

The present invention pertains to a non-linear, copolymer comprising recurring units derived from vinylidene fluoride (VDF) monomer, at least one functional comonomer and optionally at least one fluorinated ethylenic comonomer. The non-linear fluorinated copolymer comprises from 0.01 to 3.0% by moles of recurring units derived from functional comonomer. The non-linear fluorinated copolymer can be used as electrode binder in batteries.

14 Claims, No Drawings

NON-LINEAR VINYLIDENE FLUORIDE COPOLYMERS

This application claims priority to U.S. Provisional Application No. 63/350,029, filed Jun. 8, 2022, said application incorporated herein by reference.

FIELD OF THE INVENTION

The invention relates to novel non-linear, functional, vinylidene fluoride copolymers comprising vinylidene fluoride, one or more functional comonomers and one or more fluorinated ethylenic comonomers, a process to make, and their use as electrode binder in batteries.

BACKGROUND OF THE RELATED ART

Vinylidene fluoride copolymers are traditionally used for applications requiring special properties, such as low surface energy, high resistance to chemical attack, aging resistance, and electrochemical stability. There is a need for fluorinated polymers having modified properties, imparted by functional groups, which can augment their properties, particularly adhesion to metal foils, especially those foils that are used as current collectors in lithium ion secondary batteries.

It is nevertheless difficult to add functional comonomer units directly into the vinylidene fluoride copolymer during polymerization, due to the aggressive nature of the fluorine-containing, polymerizing free radicals. In one example of methodology to produce functionalized vinylidene fluoride copolymers, functional comonomers (e.g. (meth)acrylic acids) are grafted onto the preformed vinylidene fluoride copolymer chains using methods known in the art. Such materials have been developed targeting improvement of adhesion towards metals, e.g. aluminium or copper, or hydrophilic properties while leveraging the mechanical properties and chemical inertness of the poly(vinylidene fluoride) (PVDF) copolymer base material. As outlined in Heng, T., et.al., "Graft Modification of PVDF-Based Fluoropolymers", Progress in Chemistry, 33(4), 2021, 596-609, often, these materials are produced by surface functionalization of pre-formed PVDF materials, so as to obtain grafted copolymers. Such grafted copolymers suffer from the drawback that grafting is generally limited to surface-functionalization only. These types of materials are non-homogeneously functionalized, and their production process is limited to occurring on already-formed articles, and the harsh processes used can lead to chain scission, so that the final material possess impaired mechanical properties.

U.S. Pat. No. 8,337,725 discloses copolymerization of vinylidene fluoride with at least one hydrophilic (meth) acrylic monomer of formula:

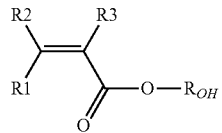

wherein each of $R_1$, $R_2$, $R_3$, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group to produce a linear vinylidene fluoride copolymer product. While this methodology produces a linear, functional, copolymer product, reaction time is rather long and ultimate productivity is low, resulting in increased cost.

U.S. Pat. No. 9,434,837 discloses an emulsion process whereby acid-group-containing comonomers are added to the polymerization in an amount up to 1.0 wt % vs. total monomers at temperatures of 20-130° C. and pressure of 280-20,000 kPa.

U.S. Pat. No. 9,441,054 discloses an emulsion polymerization of vinylidene fluoride comprising meth acrylic monomer and comprising end groups having formula $CF_2H$ and/or $CH_3$ in an amount of at least 30 mmoles per kg of vinylidene fluoride (VDF) recurring units.

U.S. Ser. No. 10/079,388 discloses an aqueous latex comprising at least one vinylidene fluoride polymer comprising recurring units derived from vinylidene fluoride and at least one (meth) acrylic monomer produced by emulsion polymerization.

WO2018/092675 discloses a copolymer of vinylidene fluoride, chlorotrifluoroethylene, and an acrylic acid derivative. The polymerization reaction time is stated to be 100 hours or less, with representative examples showing 32 hours and 19 hours at 28 C.

WO2018092677 (US2019/0326602) discloses an electrode mixture for lithium ion battery having a binder wherein the binder composition includes a first copolymer of vinylidene fluoride and a polar group-containing compound and a second copolymer of vinylidene fluoride and chlorotrifluoroethylene.

WO2019/167338 (US20210047448) discloses a vinylidene fluoride polymer including a first structural unit derived from vinylidene fluoride and a second structural unit derived from monomer other than vinylidene fluoride. The monomer to be the second structural unit is a primary amine, a secondary amine, or a tertiary amine having at least one of a hydroxyl group and a carboxyl group, and the content of the second structural unit is from 0.05 to 20.0 mol %.

JP2019160651 discloses a vinylidene fluoride copolymer with ethyoxylated acrylate comonomer produced by suspension polymerization with an intrinsic viscosity of 0.1 to 5.0 dL/g.

Electrodes are used in energy storing devices, including, but not limited to, batteries, capacitors, ultra-capacitors, non-aqueous-type secondary batteries and such.

The art is silent as to functional vinylidene fluoride copolymers obtained by copolymerizing vinylidene fluoride and functional comonomers that result in a branched, non-linear architecture, and their performance as binders for battery electrode compositions. In fact, U.S. Pat. No. 8,337,725 specifically teaches that linear vinylidene fluoride copolymers are highly desirable in this application.

For a commercial Solvay product (Solef® 5130), believed to be produced according to U.S. Pat. No. 8,337,725, detailed Size Exclusion Chromatography (SEC) analysis has revealed 7 weight % branched architecture, expressed as the weight % of the molar mass distribution exhibiting branching as indicated by having a slope (α) of ≤0.5 in a Mark-Houwink plot of log Intrinsic Viscosity vs. Molar Mass (see Striegel, Yau, Kirkland, Bly, Modem Size-Exclusion Liquid Chromatography, 2nd ed. (2009)). Test method described below in the Example section. This product would be considered linear (defined as <10 wt % branched architecture).

Vinylidene fluoride copolymers find application as the binder in electrode articles used in lithium ion batteries. As the demand for greater battery performance intensifies, the need for reduction of the binder content in the electrodes has increased. To reduce the binder content, it is paramount to increase the performance of the binder material. This performance can be determined by an adhesion test whereby a formulated electrode is subjected to a peel test. Increases in resultant peel values obtained from this test translates to improved binding performance, and the potential to reduce the overall binder loading, increasing active material loading, and improving battery capacity. Here, we present the use of a non-linear vinylidene fluoride copolymer for this application, exhibiting excellent peel adhesion performance.

The present invention solves the above-cited problems by providing a non-linear, fluorinated copolymer comprising vinylidene fluoride, optionally a fluorinated ethylenic comonomer and a functional comonomer. We have found that vinylidene fluoride/functional comonomer copolymers that contain branched architecture (branched means ≥10 wt %) display excellent adhesion to metal foils (measured as electrode peel strength). These copolymers are made by using low temperature initiators with a 10 hour half-life temperature of less than or equal to 53 C.

BRIEF SUMMARY OF THE INVENTION

The invention relates to a non-linear, vinylidene fluoride copolymer comprising VDF, an optional fluorinated ethylenic comonomer and a functional comonomer. The invention also relates to a suspension process for forming the copolymer of the vinylidene fluoride and comonomer(s).

The invention further contemplates a process for preparing the fluorinated copolymer in an aqueous reaction medium, comprising:
a) at least one low-temperature initiator, a stabilizer, at least vinylidene fluoride, and a functional comonomer, optionally, fluorinated comonomers
b) initiating copolymerization of vinylidene fluoride with said functional comonomer with stirring, heating and super-atmospheric pressure.

The invention further relates to articles formed from the fluorinated copolymer. These articles find uses in applications such as an electrode or separator for a battery.

The invention further relates to a formulation comprising the vinylidene fluoride copolymer in a solvent, and may further comprise activated carbon and metal chalcogenide particles selected from the group: lithium iron phosphate (LFP), lithium nickel manganese cobalt oxide (NMC), lithium-manganese-cobalt-oxide, lithium-nickel-cobalt-aluminum oxide, lithium-manganese oxide, and lithium-nickel-manganese oxide.

Aspects of the Invention
Aspect 1. A non-linear fluorinated copolymer comprising:
at least 87.0 mol % vinylidene fluoride and
from 0.01 to 3.0 mol % of at least one functional comonomer of Formula 1:

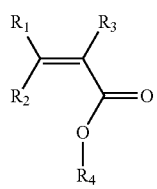

(Formula 1)

wherein each of $R_1$, $R_2$, R3, equal or different from each other, is independently a hydrogen atom or a $C_1$-$C_3$ hydrocarbon group, and $R_4$ is a hydrogen or a $C_1$-$C_{16}$ hydrocarbon moiety comprising at least one hydroxyl group;

and optionally at least one fluorinated ethylenic comonomer, wherein said non-linear fluorinated copolymer contains at least 10 wt % branched architecture preferably at least 15 wt % branched architecture and more preferably at least 20 wt % branched architecture as measured by size exclusion chromatography and
the average primary particle size of the non-linear fluorinated copolymer is greater than 10 microns.

Aspect 2. The non-linear fluorinated copolymer of Aspect 1, wherein the fluorinated ethylenic comonomer is selected from the group consisting of tetrafluoroethylene (TFE), chlorotrifluoroethylene (CTFE), hexafluoropropene (HFP).

Aspect 3. The non-linear fluorinated copolymer of Aspect 1 or 2, wherein at least one functional comonomer comprises Formula 1 wherein $R_4$ is a hydrogen.

Aspect 4. The non-linear fluorinated copolymer of any one of Aspects 1 to 3, wherein the at least one functional comonomer comprises acrylic acid.

Aspect 5. The non-linear fluorinated copolymer of any one of Aspects 1 to 4, wherein functional comonomer content incorporated into the polymer is from 0.01 to 2.0 mol % of the total non-linear fluorinated copolymer.

Aspect 6. The non-linear fluorinated copolymer of any one of Aspects 1 to 5, wherein the fluorinated ethylenic comonomer comprises up to 10.0 mol %, preferably up to 5.0 mol % of the total monomer units in the non-linear fluorinated copolymer.

Aspect 7. The non-linear fluorinated copolymer of any one of Aspects 1 to 6, wherein the fluorinated ethylenic comonomer comprises HFP.

Aspect 8. The non-linear fluorinated copolymer of any one of Aspects 1 to 7, wherein the fluorinated ethylenic comonomer comprises at least 90.0 mol % VDF and from 0.1 to 9.99 mol % HFP.

Aspect 9. The non-linear fluorinated copolymer of any one of Aspects 1 to 8, wherein the viscosity of a solution of N-methyl-2-pyrrolidone containing 9.0% by weight of said non-linear fluorinated copolymer, measured at 230° C. with a controlled shear rate of 3.36 revolutions/sec, is equal to or greater than 4000 mPa·s and less than 45000 mPa·s, preferably equal to or greater than 5000 mPa·s and less than 30000 mPa·s, most preferably equal to or greater than 5000 mPa·s and less than 20000 mPa·s.

Aspect 10. The non-linear fluorinated copolymer of any one of Aspects 1 to 9, wherein the fraction of randomly distributed functional comonomer is less than 37%.

Aspect 11. A method to make the non-linear fluorinated copolymer of any one of Aspects 1 to 10 wherein the method comprises polymerizing, in a suspension polymerization process, vinylidene fluoride and
from 0.01 to 3.0 mol %, based on total monomer feed, of at least one functional comonomer of formula 1:

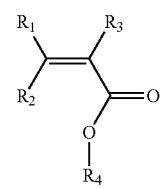

(Formula 1)

wherein each of $R_1$, $R_2$, $R_3$, equal or different from each other, is independently a hydrogen atom or a C1-C3 hydrocarbon group, and $R_4$ is a hydrogen or a $C_1$-$C_{16}$ hydrocarbon moiety comprising at least one hydroxyl group;

and optionally at least one fluorinated ethylenic comonomer, in the presence of an low temperature initiator, at a temperature of from between 20 to 70° C., preferably, 35 to 60° C., wherein the low temperature initiator has a 10 hour half-life temperature of less than or equal to 53° C., preferably less than or equal to 51° C.

Aspect 12. The method of Aspect 11, wherein the low temperature initiator comprises at least one of di-n-propyl peroxydicarbonate (NPP), diisopropyl peroxydicarbonate (IPP), acetyl cyclohexane-sulfonyl peroxide, or diisobutyryl peroxide.

Aspect 13. The method of Aspect 11 or 12, wherein the low temperature initiator is added to the reaction mixture in an amount of from about 0.01 to about 5.0 weight percent on total monomer weight, and is preferably added in an amount from about 0.05 to about 2.5 weight percent on total monomer weight.

Aspect 14. The method of any one of Aspects 11 to 13, wherein the pressure during polymerization is from at 280-40,000 kPa, preferably 2,000-20,000 kPa.

Aspect 15. The method of any one of Aspects 11 to 14, wherein the functional comonomer is added to the polymerization continuously.

Aspect 16. The method of any one of Aspects 11 to 14, wherein the functional comonomer is added to the polymerization non-continuously.

Aspect 17. A composition for lithium ion batteries comprising the non-linear fluorinated copolymer of any one of Aspects 1 to 10, active material, a nonaqueous solvent and a conductive material and optionally a viscosity modifying agent.

Aspect 18. The composition of Aspect 17, comprising: (a) the non-linear fluorinated copolymer, in an amount from 0.5 to 5.0% wt, preferably from 0.5 to 3.0% wt, with respect to the total weight (a)+(b)+(c); (b) conductive material, in an amount from 0.5 to 5.0% wt, preferably from 0.5 to 3.0 wt %, with respect to the total weight (a)+(b)+(c); (c) active material, preferably a composite metal, in an amount from 90 to 99 wt %, preferably from 94 to 99 wt. %.

Aspect 19. An electrode for lithium ion battery obtained by applying the composition of aspect 18 to a metal film, and drying the coating.

Aspect 20. A lithium ion battery having the electrode of aspect 19.

Aspect 21. An article comprising the non-linear fluorinated copolymer of any one of Aspects 1 to 10.

DETAILED DESCRIPTION

"Copolymer" is used to mean a polymer having two or more different monomer units.

"Polymer" is used to mean both homopolymer and copolymers.

"Linear" is used per the well-understood definition in the art of a polymer chain bearing a single chain structure and only two end-groups. (Page 3 in R. J. Young and P. A. Lovell, Introduction to Polymers, Second Ed., London, 1991.) In this case, the polymer chain comprises only the prescribed (co)monomer units, and is devoid of any other architectural variance such as additional, bonded chains ("branches") of any length or number.

"Non-Linear" is used per the well-understood definition in the art of a polymer chain bearing one or more additional polymer chains bonded to the primary, linear polymer chain at "branch points". (Page 3 and Page 4 in R. J. Young and P. A. Lovell, Introduction to Polymers, Second Ed., London, 1991.) The additional polymer chain(s) may be of any length from two monomer units to a plurality of monomer units. Monomer units comprising a branch may be the same as, or different-from, those in the main, linear chain, but generally are derived of the same monomer units present in the main chain. Branches may, themselves, bear additional branches with these additional branches as described previously in terms of number of monomer units and composition.

"Branch points" is used per the well-understood definition in the art of a polymer backbone atomic unit whereby the first monomer unit comprising a branch is bound. For fluorinated ethylenic type polymers, this branch point is often a backbone carbon atom.

Some special cases of "branching" with "branch points" are known such as "star", "graft", "comb", "brush", "chimera", "hyperbranched", and "dendrimer" structures. (N. Hadjichristidis, et.al, Chem. Rev. 2001, 101, 3747-3792) All of these architectural variants are contemplated and included in the definition of "non-linear" at pertains to variations on "branching" structure. As described above, the compositions of the branch chains in these special cases may be of the same or different monomer composition, as well may contain monomer units in a block, random or gradient configuration.

For purposes of this invention the terms "non-linear" and "branched" mean the same thing and are used interchangeably.

"Ethylenic comonomer" means a comonomer having a polymerizable carbon-carbon double bond. Ethylenic polymer is a polymer made with ethylenic monomers.

The term "initiator" and the expressions "radical initiator" and "free radical initiator" refer to a chemical that is capable, through decomposition, of providing a source of free radicals, either produced spontaneously at ambient conditions, or by exposure to added external stimulus, such as heat or light. The term "radical" and the expression "free radical" refer to a chemical species that contains at least one unpaired electron.

"Low-temperature initiator" refers to an organic radical initiator with a ten-hour half-life of less-than or equal to 53 C. "Half-life" is used with respect to molecules that can thermally decompose into radical species to describe the rate at which this reaction occurs. The half-life value is the time it takes for one-half of a total of a unit sample of material to undergo decomposition, at a certain temperature. "Ten-hour half-life" is the temperature at which one half-life will occur for any given compound in ten hours. The initiators that are used in this invention are organic initiators that have a 10 hour half-life temperature of less-than or equal-to 53 C, preferably less than or equal to 51 C (for relevant examples of low-temperature initiators, see Polymer Synthesis, Volume 1, 1992, Section 2—Free Radical Initiation, Table II; or, "Initiators for High Polymers" Technical Product Brochure, Akzo-Nobel; or, *Organic Peroxides*, Volume 1, D. Swern ed., Wiley-Interscience, 1970, Table 20.

All references cited are incorporated herein by reference. As used herein, unless otherwise described, percent shall mean weight percent.

The invention discloses a branched fluorinated copolymer comprising vinylidene fluoride, a functional comonomer and optionally a fluorinated ethylenic comonomer.

The optional fluorinated ethylenic comonomer is preferably selected from the group consisting of tetrafluoroethylene (TFE), chlorotrifluoroethylene (CTFE) and hexafluoropropene (HFP).

The functional comonomer is preferably acrylic acid.

According to one embodiment, the fluorinated copolymer comprises vinylidene fluoride and 0.01 to 3.0 mol % of at least one ("one or more") functional comonomers.

According to one embodiment, the functional comonomer is randomly incorporated into the copolymer as determined by nuclear magnetic resonance spectrocopy ($^{19}$F NMR) in a fraction of less than 40% of the total hydrophilic monomer fed to the reaction as calculated by Equation 1 and Equation 2 below:

(Total moles dry solids produced*mol % incorporated comonomer)=moles of incorporated comonomer　　　　Equation 1:

(Equation 1)/(moles of total comonomer fed)=fraction of isolated functionalized comonomer incorporated　　　　Equation 2:

A proton-decoupled $^{19}$F NMR spectrum of the polymer powder was recorded under the following conditions.

Apparatus: Bruker AVANCE AC 400 FT NMR SPECTROMETER
Measurement Conditions:
Frequency: 376 MHz
Measurement solvent: DMSO-d
Measurement temperature: 250° C.
Number of scans: 2048

The $^{19}$F NMR spectrum was analyzed to determine the content of hydrophilic comonomer in the polymer. In detail, the area integration of peak(s) (an integral value) at −94 ppm corresponding to the four fluorine atoms present in the vinylidene fluoride-derived structural units, adjacent to the incorporated hydrophilic comonomer units, was divided by the intensity of all the peaks assigned to the fluorine atoms in the spectrum.

Another object of the present invention is a novel process for the manufacture of non-linear copolymers as above described. The process of the invention advantageously comprises polymerizing in an aqueous medium in the presence of a low-temperature initiator the vinylidene fluoride (VDF) monomer and the functional comonomer in a reaction vessel, said process comprising feeding an aqueous solution comprising functional comonomer; and maintaining the pressure in said reactor vessel exceeding the critical pressure of the vinylidene fluoride.

The invention further contemplates a process for preparing the vinylidene fluoride copolymer in an aqueous reaction medium, comprising:
a) at least one low-temperature initiator, a stabilizer, vinylidene fluoride, optionally at least one fluorinated ethylenic comonomer, and a functional comonomer,
b) Initiating copolymerization of said vinylidene fluoride, the optional fluorinated ethylenic comonomer and said functional comonomer with stirring, under heating and super-atmospheric pressure.

In the preferred embodiment, the invention comprises a non-linear copolymer comprising vinylidene fluoride having greater than 87 mole percent of vinylidene fluoride monomer units, preferably more than 90 mole percent and most preferably greater than 95 mole percent of vinylidene fluoride monomer units.

Fluorinated Ethylenic Comonomer

The present invention is a vinylidene fluoride copolymer which may optionally have a fluorinated ethylenic comonomer. Examples of fluorinated ethylenic comonomers "fluoromonomers" may be selected from the group consisting of tetrafluoroethylene (TFE), trifluoroethylene (TrFE), chlorotrifluoroethylene (CTFE), 1,2-difluoroethylene, perfluorobutylethylene (PFBE), hexafluoropropene (HFP), vinyl fluoride (VF), pentafluoropropene, 2,3,3,3-tetrafluoropropene, trifluoropropene, fluorinated (alkyl) vinyl ethers, such as, perfluoroethyl vinyl ether (PEVE), and perfluoro-2-propoxypropyl vinyl ether, perfluoromethyl vinyl ether (PMVE), perfluoropropyl vinyl ether (PPVE), perfluorobutylvinyl ether (PBVE), longer chain perfluorinated vinyl ethers, one or more of partly or fully fluorinated alpha-olefins such as 3,3,3-trifluoro-1-propene, 2-trifluoromethyl-3,3,3-trifluoropropene, 1,2,3,3,3-pentafluoropropene, 3,3,3, 4,4-pentafluoro-1-butene, hexafluoroisobutylene (HFIB), fluorinated dioxoles, such as perfluoro(1,3-dioxole) and perfluoro(2,2-dimethyl-1,3-dioxole) (PDD), partially- or perfluorinated alpha olefins of C4 and higher, partially- or per-fluorinated cyclic alkenes of C3 and higher, allylic, partly fluorinated allylic, or fluorinated allylic monomers, such as 2-hydroxyethyl allyl ether or 3-allyloxypropanediol, and combinations thereof.

Preferably, the optional fluorinated ethylenic comonomers is selected from the group consisting of tetrafluoroethylene (TFE), chlorotrifluoroethylene (CTFE), and hexafluoropropene (HFP).

Functional Comonomer

The copolymer of the invention comprises functional comonomer units. Functional comonomers are defined by Formula 1:

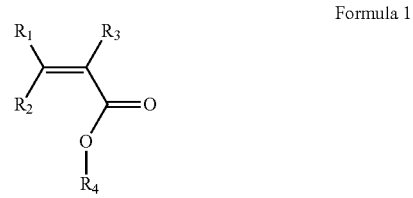

Formula 1 wherein each of $R_1$, $R_2$, $R_3$, equal or different from each other, is independently a hydrogen atom or a $C_1$-$C_3$ hydrocarbon group, and $R_4$ is a hydrogen or a $C_1$-$C_{16}$ hydrocarbon moiety comprising at least one hydroxyl group.

In some embodiments, only one of $R_1$, $R_2$, $R_3$, is a hydrogen.

In some embodiments, two of $R_1$, $R_2$, $R_3$, are hydrogen.

One or more functional comonomers can be used in combination with VDF and the optional one or more fluorinated ethylenic comonomers to form the copolymer of the invention.

Non limiting examples of functional comonomers include acids, such as, acrylic acid and methacrylic acid.

The functional comonomers may be used in an amount, for example, of from about 0.01 to about 3.0 mol % based on total monomer. Preferably, they are used in an amount from about 0.01 to about 2.0 mol % based on total monomer. In various embodiments, the total amount of functional comonomer(s) is at least 0.01 mol %, at least 0.05 mol %, at least 0.10 mol % based on total monomer. In other embodiments, the total amount of functional comonomer does not exceed 3.0 mol %, or preferably does not exceed 2.0 mol % based on total monomer. The functional comonomer may be used in solution such as in aqueous solution for convenient handling.

Process

The vinylidene fluoride copolymer of the present invention can be obtained by copolymerizing vinylidene fluoride, one or more functional comonomers represented by Formula 1 and optionally additional fluorinated ethylenic comonomers in a suspension polymerization process.

Suspending agents are used in the process to provide stability to the copolymer particles during the suspension polymerization reaction. In suspension polymerization, using water as a dispersing medium, a suspending agent may be added in a range of 0.005 to 1.0 parts by weight, and preferably in a range of 0.01 to 0.4 parts by weight, per 100 parts by weight of all the monomers used in the copolymerization.

Suspending agents include, but are not limited to, methylcellulose, methoxylated methylcellulose, propoxylated methylcellulose, hydroxyethylcellulose, hydroxypropylcellulose, polyvinyl alcohol, polyethylene oxide, and gelatin. Preferred suspending agents include functionalized cellulose, fully- and partially-hydrolyzed poly(vinyl alcohol), and inorganic clays, as described in Handbook of Polymer Reaction Engineering, Chapter 5, Free-radical Polymerization: Suspension, by B. W. Brooks, Dr. T. Meyer, Prof. J. Keurentjes, eds., Wiley, 2005, included herein by reference.

Initiators

The low temperature initiator is added to the reaction mixture in an amount sufficient to initiate and maintain the polymerization reaction at a desired reaction rate. The order of addition may vary according to the desired process characteristics. In one embodiment, all of the low-temperature initiator is added prior to the start of the polymerization process. The low temperature initiator may be added to the reaction mixture in an amount from about 0.01 to about 5.0 weight percent on total monomer, and is preferably added in an amount from about 0.05 to about 2.5 weight percent on total monomer (total monomer means vinylidene fluoride, the compound(s) represented by Formula 1, and optionally other fluorinated ethylenic comonomer chosen as necessary).

Examples of suitable low temperature initiators include peroxides, peroxyesters, peroxydicarbonates and azo compounds. The low temperature initiator may comprise an organic peroxide such as an alkyl, dialkyl, or diacyl peroxide, peroxydicarbonates, peroxy esters or mixtures thereof. Preferred peroxydicarbonate initiators include acetyl cyclohexane-sulfonyl peroxide, diisobutyryl peroxide, di-n-propyl peroxydicarbonate, diisopropyl peroxydicarbonate.

For low-temperature initiators that are largely insoluble in water, it is advantageous to pre-disperse them in water. The methodology used to disperse the low-temperature initiator in water is that typically known in the art to generate an oil-in-water emulsion, where water and the immiscible component (here, the initiator) are subjected to high shear mixing and often with the addition of a surfactant or other stabilizer, as described in "Encyclopedic Handbook of Emulsion Technology, 1st Edition, ed. Johan Sjoblom, Marcel-Dekker, New York, 2001" incorporated herein by reference. Handling the initiating species in this fashion is particularly advantageous when it has low thermal stability as evidenced by a ten-hour half-life temperature of less than 53 C. The presence of water in the low-temperature initiator dispersion or emulsion provides a heat sink for heat of decomposition and reduces the likelihood of thermal runaway reaction of the low-temperature initiator itself, greatly improving process safety. It is further advantageous for the surfactant or dispersant used to stabilize the low-temperature initiator/water dispersion or emulsion to be compatible with the copolymerization reaction, and it is most advantageous that the surfactant or dispersant used to stabilize the low-temperature initiator/water dispersion be identical to that used to stabilize the reaction emulsion or suspension.

Chain-Transfer Agents

Chain-transfer agents are optionally added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain transfer agent employed, and on the desired molecular weight of the polymer product. The amount of chain-transfer agent added to the polymerization reaction is preferably from about 0.0 to about 5.0 weight percent, more preferably from about 0.05 to about 3.0 weight percent based on the total weight of monomer added to the reaction mixture.

Oxygenated compounds such as alcohols, carbonates, ketones, esters, and ethers may serve as chain-transfer agents. Examples of oxygenated compounds useful as chain-transfer agents include isopropyl alcohol ethyl acetate, methyl acetate, diethyl carbonate, acetone, ethanol, n-propanol, acetaldehyde, propylaldehyde, ethylpropionate, and as described in U.S. Pat. No. 4,360,652. Other classes of compounds which may serve as chain-transfer agents in the polymerization of halogen-containing monomers include, for example, halocarbons and hydrohalocarbons, and chlorocarbons such as carbon tetrachloride. Simple alkanes or branched alkanes such as ethane, propane or 2-ethylhexane may also function as chain-transfer agents.

Buffering Agent

The polymerization reaction mixture may optionally contain a buffering agent to maintain a controlled pH throughout the polymerization reaction. The pH is preferably controlled within the range of from about 2.0 to about 8.0, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4.0 to about 10.0, preferably from about 4.5 to about 9.5. Preferred buffering agents in the practice of the invention include, for example, phosphate buffers and acetate buffers. A "phosphate buffer" is a salt or a mixture of salts of phosphoric acid. An "acetate buffer" is a salt of acetic acid.

Linear copolymers of vinylidene fluoride with functional comonomers, optionally with other fluorinated ethylenic monomers, are used in the industry. However prior methods of producing such linear polymers suffer from low reaction productivity, leading to difficulty to supply sufficient quantities of material to a rapidly-growing market. In some embodiments, the present invention provides high productivity of vinylidene fluoride copolymer polymerizations while maintaining or improving their adhesion performance to metal films. High productivity means having a run time for the polymerization reaction of less than 12 hours. Reducing polymerization time thereby making the process more efficient (faster) and reducing energy used is of high interest. In some embodiments of the invention, the polymerization run time is less than 12 hours, probably less than 10 hours and most preferable less than 8 hours. The more efficient the process the higher the productivity.

Co-Polymerization Conditions

The temperature used for polymerization may vary, for example, from 20-100 degrees Celsius (° C.), depending on the low-temperature initiator system chosen. The polymerization temperature is preferably from 35-75° C., and most preferably from 35-60° C.

Generally, the process of the invention is carried out at a temperature of from 20 to 70° C., preferably higher limit of 60° C., at least 35° C., preferably of at least 40° C., more preferably of at least 45° C. The temperature used during the polymerization process can be varied or can be maintained at a constant temperature.

The pressure used for polymerization may vary from 280-40,000 kilopascals (kPa), depending on the capabilities of the reaction equipment, the low-temperature initiator system chosen, and the monomer selection. The polymerization pressure is preferably from 2,000-20,000 kPa.

Optionally, the functional comonomer can be continuously fed throughout the entire polymerization. In the case where a non-continuous feed is used, the feed profile may be varied in terms of rate and/or provided to the reactor in a non-continuous fashion. As such, the functional comonomer feed may occur in multiple aliquots throughout the course of the polymerization.

An incremental addition of VDF or fluorinated ethylenic comonomer can also be effected during polymerization. In one embodiment, all the VDF monomer required is introduced before the onset of the polymerization.

By performing aqueous suspension polymerization under the conditions described above, vinylidene fluoride, the compound represented by Formula 1, and the other optional fluorinated ethylenic comonomer(s) are copolymerized to obtain the vinylidene fluoride copolymer of the present invention.

At most, 10.0 weight percent of the compound represented by Formula 1 relative to total monomer feed is fed into the polymerization process, preferably less than 4 wt percent, more preferably 3 wt percent or less of the compound represented by Formula 1 based on total monomer feed to the polymerization reaction.

The polymerization occurs under stirring or other agitation. The stirring/agitation may be constant, or may be varied in rate to optimize process conditions during the course of the polymerization. In one embodiment, multiple stirring speeds and multiple temperatures are contemplated for controlling the reaction.

A polymerization reaction in accordance with the present invention may be carried out by charging a reactor with water (preferably deionized water), a suspending agent, vinylidene fluoride, the optional at least one fluorinated ethylenic comonomer, at least one functional comonomer represented by Formula 1, and optionally, a chain-transfer agent and/or an buffer. Air is purged from the reactor prior to the introduction of the monomers. Water is added to the reactor before bringing the reactor to the desired starting temperature, but the other materials may be added before or after bringing the reactor to temperature. At least one low-temperature initiator is added to start and maintain the polymerization reaction. Additional monomer may be optionally added to replenish monomer that is consumed, and other materials, such as buffer or chain-transfer agent, may be optionally added during the course of the polymerization to maintain the reaction and adjust the final product properties.

The order in which the polymerization components are combined may be varied, although it is generally preferred that at least a portion of the functional comonomer is present in the aqueous reaction medium prior to the initiation of the polymerization of the fluorinated ethylenic comonomer. An additional amount of functional comonomer may be fed to the reactor during the reaction in a manner as described previously.

Alternatively, no additional fluorinated ethylenic comonomer is fed to the reactor and pressure is maintained solely by the feed of functional comonomer in bulk or in solution and/or additional ingredients such as low-temperature initiator or buffer or simply deoxygenated water.

The monomer feed is terminated when the desired weight of monomer has been fed to the reactor. Additional low-temperature initiator is optionally added, and the reaction is allowed to decrease in pressure for a suitable amount of time. The reactor pressure decreases as the monomer within the reactor is consumed. Feed of functional comonomer may be continued or stopped at this point. If the feed of functional comonomer is stopped, the copolymer produced during this segment of the reaction will be lower in functional comonomer content, or devoid of functional comonomer.

Upon completion of the copolymerization reaction, the reactor is brought to ambient temperature and the residual unreacted monomer is vented to atmospheric pressure. The aqueous reaction medium containing the copolymer is then recovered from the reactor. The product consists of a mixture of the reaction components, i.e., water, residual functional comonomer, low-temperature initiator (and/or decomposition products of the initiator) and copolymer solids.

Product Handling

The product of the copolymerization is a solid that can be separated from the aqueous components and dried by usual methods known in the art, including filtration other suitable solid/liquid separation technique such as centrifugation. Once isolated, solid product can be purified by washing with deionized water or other techniques, and it may be dried for use as a powder, which can be further processed into granules, pellets or the like.

Characterization of the Inventive Non-Linear Copolymer

The fluorinated copolymer of the present invention is non-linear. The fluorinated copolymer contains at least 10 wt % branched architecture as measured by size exclusion chromatography, using Mark-Houwink plots as described in Striegel, Yau, Kirkland, Bly, Modern Size-Exclusion Liquid Chromatography, 2nd ed. (2009), incorporated herein by reference, preferably at least 15 wt % branched architecture and most preferably at least 20 wt % branched architecture. The test method is described below.

The primary particle size of the copolymer of the present invention is greater than 10 microns. This can be measured using optical microscopy measurement using eyepiece reticles in combination with stage micrometers.

Preferably, the functional comonomer has less than 40% isolated functionalized comonomer in the backbone based on mole percent. The copolymer of the present invention may have a fraction of isolated, functional comonomer of less than 37%, preferably less than 36%. Determined by $^{19}$F NMR.

Preferably, solution viscosity of the fluorinated copolymer is such that the viscosity of a solution of N-methyl-2-pyrrolidone containing 9.0% by weight of said vinylidene fluoride copolymer, measured at 230° C. with a controlled shear rate of 3.36 revolutions/sec, is equal to or greater than 2000 mPa·s and preferably equal to or greater than 5000 mPa·s and most preferably equal to or greater than 6000 mPa-s and less than 30000 mPa-s, less than 20000 mPa-s and preferably less than 15000 mPa-s. The solution viscosity is measured using a Brookfield DV3 rotary viscometer comprising a spindle of SC4-34 type, using a circulating temperature-controlled bath set at 23° C. and rotation rate corresponding to a shear rate of 3.36 s$^{-1}$.

Electrodes and Battery

The present invention also relates to components of a lithium ion battery such as electrodes or separators comprising the nonlinear fluorinated copolymer. The nonlinear fluorinated copolymer can be used as a binder in a formulation for an electrode, be it a cathode or an anode. The invention encompasses a battery comprising the fluorinated copolymer described herein.

The invention further relates to a formulation comprising the nonlinear fluorinated copolymer in a solvent. Still an object of the invention is the use of the non-linear fluorinated copolymer composition as binder, especially for forming electrodes of lithium batteries and/or electric double layer capacitors. Also an object of the invention is an electrode-forming composition comprising solvent, the non-linear fluorinated copolymer, active material (powdery electrode material) and, optionally, a conductive material and/or a viscosity modifying agent.

Formulation of Electrode Slurry

When the desired electrode to be produced is a cathode, the formulation slurry required to form the cathode comprises solvent, polymeric binder, active material and a conductive material. The active material and conductive material are preferably, dry and powdery. When the electrode is an anode, the slurry to form the anode comprises solvent, polymeric binder and a conductive material. Conductive material may be one or more of one or more of: coke, carbon black, graphite, activated carbon, carbon fibers, silicon, graphene, graphene oxide and carbon nanotubes.

When using the nonlinear fluorinated copolymer of the invention as a binder, a binder solution of the non-linear fluorinated copolymer is generally prepared. To obtain the binder solution of the non-linear fluorinated copolymer, it is preferred to dissolve 0.1-10.0 parts by weight, particularly 1.0-5.0 parts by weight, of the non-linear fluorinated copolymer in 100 parts by weight of an organic solvent. Any suitable organic solvent that dissolves the polymeric binder may be used.

The organic solvent used for dissolving the non-linear fluorinated copolymer binder to provide the non-linear fluorinated copolymer binder solution according to the present invention may preferably be a polar one, examples of which may include: N-methyl 2-pyrrolidone (NMP), dimethylsulfoxide (DMSO), N,N-dimethylformamide (DMF), triethylphosphate (TEP), acetone, tetrahydrofuran, methyl ethyl-ketone (MEK), methyl isobutyl ketone (MiBK), ethyl acetate (EA), butyl acetate (BA), dimethyl carbonate (DMC), diethyl carbonate (DEC) or methyl ethyl carbonate (MEC), N-ethyl-2-pyrrolidone, N,N-dimethylacetamide, hexamethylphosphoramide, dioxane, tetramethylurea, (1R)-7,8-Dioxabicyclo[3.2.1]octan-2-one (Cyrene™ from MilliporeSigma), and trimethyl phosphate (TMP). These solvents may be used singly or in mixture of two or more. The polymeric binder composition is dissolved in the solvent with applied agitation or heating to make a polymeric binder solution.

The active material comprise lithium metal compounds, which are well known in the art. See, for example, US2018/0076444 and US2020373560. The active material for a cathode are generally lithium transition metal alloy chalcogenide compounds such as: lithium iron phosphate (LFP), lithium nickel manganese cobalt oxide (NMC), lithium-manganese-cobalt-oxide, lithium-nickel-cobalt-aluminum oxide, lithium-manganese oxide, and lithium-nickel-manganese spinel.

A conductive material may be added in order to improve the conductivity of a resultant composite electrode layer formed by applying and drying of the electrode-forming composition of the present invention. Conductive materials include but are not limited to carbonaceous materials, such as, graphite fine powder and fiber, carbon black, Super P® carbon black, C-NERGY™ carbon black, KETJENBLACK, DENKA BLACK, thermal black, channel black, carbon fiber, carbon nanotubes, and acetylene black, and fine powder and fiber of metals, such as nickel and aluminum. The preferred conductive material is carbon black.

In one embodiment, the non-linear fluoropolymer binder material may be used as a component of an electric double-layer capacitor. The active material for an electric double layer capacitor may preferably comprise fine particles or fiber, such as activated carbon, activated carbon fiber, silica or alumina particles, having an average particle (or fiber) diameter of 0.05-100 um and a specific surface area of 100-3000 m/g, i.e., having a relatively small particle (or fiber) diameter and a relatively large specific surface area compared with those of active substances for batteries.

The solid content (weight %) of the electrode slurry comprising fluorinated copolymer binder, active material and conductive material, is preferably in the range of 71 to 87 weight %, more preferably about 75 to 85 weight %. The solid content (weight %) of the electrode slurry can be between 80 weight % and 87 weight %.

The content of solid components of a formulation for a cathode having active materials, conductive material and polymeric binder can vary in amount versus each component. Preferably, the amount of active material is about 90-99% by weight based on total solids; the amount of conductive material is about 0.5 to 5.0% by weight based on total solids, and the amount of fluorinated copolymer binder is about 0.5 to 5.0% by weight based on total weight of active material, conductive material and fluorinated copolymer binder. The electrode slurry may optionally contain other additives such as viscosity modifiers. Preferably, the electrode slurry does not contain additives.

Forming the Electrode

The fluorinated copolymer binder in the form of a solvent solution or dispersion is blended with one or more active powdery electrode forming materials to form a slurry dispersion or paste. This dispersion or paste is then applied to one or both surfaces of an electroconductive substrate using techniques for application of a uniform wet coating as known in the art, and dried to form a dry, composite electrode layer. The electrode layer may then be compressed by any method known in the art, including calendaring as shown in U.S. Pat. Nos. 5,776,637 and 6,200,703, where a fluoropolymer binder is dissolved in NMP and processed into an electrode. In an alternative method, the polymeric binder in the form of a powder is blended with one or more active powdery electrode forming materials, and then solvent is added to form a slurry dispersion or paste. The subsequent steps of application, drying, and calendaring are the same as above.

The electrode slurry composition may be applied onto at least one surface, preferably both surfaces, of an metal current collector and dried at elevated temperature, e.g., 50-170° C., to form a dry, composite electrode layer. Any metal having high conductivity and no reactivity in a voltage range of the battery to be constructed may be used as the metal current collector, to which the composite electrode layer is strongly adhered. Such substrates include a foil or wire net of a metal, non-limiting example include iron, stainless steel, steel, copper, lithium, aluminum, nickel, silver or titanium or combinations thereof.

Other Uses

The inventive non-linear functional polyvinylidene fluoride can be used for membranes/antifouling, sizing for fibers (carbon-fiber), tie-layer for multi-layer sheets, adhesive (general), water or proton-permeable membrane, battery separator coating, (fluoro)polymer blend compatibilizer, component of a paint or industrial coating.

The present invention, its characteristics and the various advantages which it provides will become more clearly apparent on reading the examples which follow and which are provided as explanatory and nonlimiting examples.

EXAMPLES

Particle size of polymeric powder is measured using laser diffraction a Microtrac S3500 particle size analyzer. The data is volume-average particle size (diameter).

Mole percent of vinylidene fluoride in the copolymer can be determined using $^{19}$F-NMR.

The weight percent (wt %) branched architecture contained in the non-linear fluoropolymer is determined using the following method:

Multi-detector size exclusion chromatography was used to measure the absolute molar mass and intrinsic viscosity of the samples. The absolute molar mass obtained by multi-detector light scattering and the intrinsic viscosity obtained by differential viscometry were combined in the form of a Mark-Houwink plot to determine the molecular architecture, defined by the Mark-Houwink slope ($\alpha$) at each molar mass value. The branching molar mass was determined based on the molar mass corresponding to a change in slope of the Mark-Houwink plot from ($\alpha$)>0.5 to ($\alpha$)≤0.5. Material are considered linear when ($\alpha$)>0.5. Materials are considered branched (non-linear) when ($\alpha$)≤0.5. The wt % branched architecture was determined by integrating the area of the molar mass distribution of the sample that has molar masses corresponding to a Mark-Houwink slope ($\alpha$)≤0.5.

Sample Preparation: Dissolution of polymer at 1.0 mg/mL in DMSO with 0.1% LiCl, under gentle shaking and heating at 90° C. for 72 hours. Samples solutions were analyzed as is with no additional filtering.

Mobile Phase: DMSO with 0.1% LiCl
Flow Rate: 0.50 mL/min
Temperature: 50° C.
Separation Unit: Agilent 1200
Injection Volume: 100 µL
Columns: Two PSS PFG Analytical Linear XL Columns and a guard column (7.8 mm I.D.×30 cm, 7 µm)
Detectors: Wyatt HELEOS 8+Light Scattering Detector, ViscoStar III Differential Viscometer and Wyatt T-rEX refractometer.
Software for data acquisition and processing: ASTRA 7

Example 1: Synthesis

A cylindrical, jacketed, high-pressure autoclave of 17.5 L internal volume is fitted with an overhead stirrer, stirring shaft with three, 45-degree pitched-blade agitators, thermocouple and pressure sensors. A 1.0 wt. % solution of acrylic acid ("AA") in deionized water is produced by adding 40.0 g of AA to 3960 g of deionized water. This solution is added to a charge pot connected to a high-pressure reciprocating diaphragm pump, which is connected to the autoclave. 4.13 g of Methocel® K100LV (DuPont) (hydroxypropyl methylcellulose (HPMC)) is dissolved in 8717 mL of deionized water and charged to the autoclave. 650 g of an emulsion of 3.0 wt % di-n-propyl peroxydicarbonate (NPP) in deionized water is produced by adding 19.5 g NPP, 1.0 g Methocel K100LV and 629.5 g H2O pre-chilled to 5° C. to a 1.0 L plastic bottle and agitating the mixture under high shear for 10 minutes. The entire contents of this emulsion (650 g) is then charged to the autoclave. The agitator is started at 400 rpm and the autoclave is pressurized to 88 bar(g) (8800 kPa) with vinylidene fluoride (VDF), then the temperature is increased to 50° C. with autogenous pressure increase to 100 to 105 bar(g) (10,000 to 10,500 kPa). The feed of AA solution is started at a low rate (~50-100 mL/hr) Additional (VDF) is then added to increase the pressure to 115 bar(g) (11,500 kPa). The start of polymerization is noted by decrease in reactor pressure, at which time the feed of the AA solution is increased and continually adjusted (300-700 g/hr) to maintain the reactor pressure at 115 bar(g) (11,500 kPa). The reaction is continued in this fashion for 447 minutes at which point, the AA feed pump is stopped and autoclave pressure is allowed to decrease for 60 minutes. At that point, the autoclave is cooled to 25° C., vented and product is discharged as a foamy aqueous dispersion. A total of 3661 g of AA solution was added over the reaction time. The solid product is separated from water by gravity filtration using a porous cloth. The wet solid product is then dried in a ventilated convection oven to constant weight. 1676 g of dry product is recovered as white powder.

Example 2

A cylindrical, jacketed, high-pressure autoclave of 17.5 L internal volume is fitted with an overhead stirrer, stirring shaft with three, 45-degree pitched-blade agitators, thermocouple and pressure sensors. A 1.5 wt. % solution of acrylic acid (AA) in deionized water is produced by adding 60.0 g of AA to 3940 g of deionized water. This solution is added to a charge pot connected to a high-pressure reciprocating diaphragm pump, which is in-tern connected to the autoclave. 4.13 g of Methocel K100LV is dissolved in 8717 mL of deionized water and charged to the autoclave. 650 g of an emulsion of 3.0 wt % di-n-propyl peroxydicarbonate (NPP) in deionized water is produced by adding 19.5 g NPP, 1.0 g Methocel K100LV and 629.5 g H2O pre-chilled to 5° C. to a 1.0 L plastic bottle and agitating the mixture under high shear for 10 minutes. The entire contents of this emulsion (650 g) is then charged to the autoclave. The agitator is started at 400 rpm and the autoclave is pressurized to 88 bar(g) (8800 kPa) with vinylidene fluoride (VDF), then the temperature is increased to 50° C. with autogenous pressure increase to 100 to 105 bar(g) (10,000 to 10,500 kPa). The feed of AA solution is started at a low rate (~50-100 mL/hr) Additional (VDF) is then added to increase the pressure to 115 bar(g) (11,500 kPa). The start of polymerization is noted by autogenous decrease in reactor pressure, at which time the feed of the AA solution is increased and continually adjusted (300-700 g/hr) to maintain the reactor pressure at 115 bar(g) (11,500 kPa). The reaction is continued in this fashion for 459 minutes at which point, the AA feed pump is stopped and autoclave pressure is allowed to autogenously decrease for 60 minutes. At that point, the autoclave is cooled to 25° C., vented and product is discharged as a foamy aqueous dispersion. A total of 3603 g of AA solution was added over the reaction time. The solid product is separated from water by gravity filtration using a porous cloth. The wet solid product is then dried in a ventilated convection oven to constant weight. 2825 g of dry product is recovered as white powder.

Branching, randomness and solution viscosity were measured.

TABLE 1

| ID | Functional Comonomer content (wt %) | Reaction Time (min) | wt % Branched Architecture | Randomness (% incorporated func. comon. vs. total fed) | Solution Visc. (mPa*s @ 9% in NMP) |
|---|---|---|---|---|---|
| S5130 | 0.8 | 8.8-11.2(1) | 7 | 58.1-66.5(1) | 9470 |
| Example 1 | 0.5 | 7.4 | 20 | 30.6 | 13341 |
| Example 2 | 0.7 | 7.6 | 24 | 35.2 | 9694 |

S5130 is Solef ® 5130 from Solvay and is believed to be made according to U.S. Pat. No. 8,337,725. Reaction time and randomness reflect data from patent examples.

Electrodes

The formulation is prepared using a Thinky ARE-310 mixer. After the non-linear fluoropolymer binder solution is added to the carbon black, seven 6.5 mm zirconium beads are added to the Thinky cup. The mixture is mixed for two minutes, three times, at 2000 RPM for a total of six minutes of mixing to generate the conductive material slurry. Active material is added along with the first addition of NMP. The active material slurry is mixed for one minute at 2000 RPM, two times. NMP is added and the active material slurry is mixed for one minute at 2000 RPM, two times. The remaining aliquots of NMP are added and mixed for one minute at 2000 RPM in between each addition to obtain the electrode slurry. The total mixing time of the entire formulation is 13 minutes.

The resulting slurry is cast onto an aluminum substrate using a doctor blade. The gap setting on the doctor blade was set at 135 micrometer wet thickness, and the resulting wet electrode was placed in a 120 C oven for 30 minutes.

The dried electrode has a film thickness of 70-75 micrometers and mass loading of 18-20 mg/cm$^2$. The electrode was cut into one inch (25.4 mm) strips and fed into a pneumatically controlled calendaring machine. The electrode was compressed to a target thickness 55 micrometers. The calendared electrode is used in the peel testing process.

Electrode Peel Strength was measured in 1800 peel test according to ASTM D903.

TABLE 2

| ID | Functional Comonomer content (wt %) | Electrode Peel (N/m) |
|---|---|---|
| Example 1 | 0.50 | 195 |
| Example 2 | 0.70 | 183 |
| S5130 | | 178* |

(1) *Average value from 3 separate production processes.

Examples 1 and 2 show exemplary performance as battery electrode binders.

What is claimed is:

1. A non-linear fluorinated copolymer comprising:
at least 87.0 mol % vinylidene fluoride and
from 0.01 to 3.0 mol % of at least one functional comonomer of Formula 1:

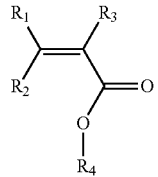

(Formula 1)

wherein each of $R_1$, $R_2$, $R_3$, equal or different from each other, is independently a hydrogen atom or a $C_1$-$C_3$ hydrocarbon group, and $R_4$ is a hydrogen or a $C_1$-$C_{16}$ hydrocarbon moiety comprising at least one hydroxyl group;

and optionally at least one fluorinated ethylenic comonomer, wherein said non-linear fluorinated copolymer contains at least 10 wt % branched architecture and the average primary particle size of the non-linear fluorinated copolymer is greater than 10 microns, and wherein the viscosity of a solution of N-methyl-2-pyrrolidone containing 9.0% by weight of said non-linear fluorinated copolymer, measured at 23° C. with a controlled shear rate of 3.36 revolutions/sec, is equal to or greater than 4000 mPa·s and less than 45000 mPa·s.

2. The non-linear fluorinated copolymer of claim 1, wherein the fluorinated ethylenic comonomer is selected from the group consisting of tetrafluoroethylene (TFE), chlorotrifluoroethylene (CTFE), hexafluoropropene (HFP) and combinations thereof.

3. The non-linear fluorinated copolymer of claim 1, wherein at least one functional comonomer comprises Formula 1 wherein $R_4$ is a hydrogen.

4. The non-linear fluorinated copolymer of claim 1, wherein the at least one functional comonomer comprises acrylic acid.

5. The non-linear fluorinated copolymer of claim 1, wherein functional comonomer content incorporated into the polymer is from 0.01 to 2.0 mol % of the total non-linear fluorinated copolymer.

6. The non-linear fluorinated copolymer of claim 1, wherein the fluorinated ethylenic comonomer comprises up to 10.0 mol % of the total monomer units in the non-linear fluorinated copolymer.

7. The non-linear fluorinated copolymer of claim 1, wherein the fluorinated ethylenic comonomer comprises HFP.

8. The non-linear fluorinated copolymer of claim 1, wherein the fluorinated ethylenic comonomer comprises at least 90.0 mol % VDF and from 0.1 to 9.99 mol % HFP.

9. The non-linear fluorinated copolymer of claim 1, wherein the fraction of randomly distributed functional comonomer is less than 37%.

10. A composition for lithium ion batteries comprising a non-linear fluorinated copolymer, active material, a non-aqueous solvent and a conductive material and optionally a viscosity modifying agent, wherein the non-linear fluorinated copolymer comprises:
at least 87.0 mol % vinylidene fluoride, and
from 0.01 to 3.0 mol % of at least one functional comonomer of Formula 1:

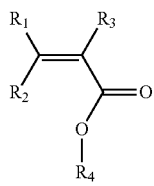

(Formula 1)

wherein each of $R_1$, $R_2$, $R_3$, equal or different from each other, is independently a hydrogen atom or a $C_1$-$C_3$ hydrocarbon group, and $R_4$ is a hydrogen or a $C_1$-$C_{16}$ hydrocarbon moiety comprising at least one hydroxyl group;

and optionally at least one fluorinated ethylenic comonomer, and wherein said non-linear fluorinated copolymer contains at least 10 wt % branched architecture and the average primary particle size of the non-linear fluorinated copolymer is greater than 10 microns.

11. The composition of claim 10, comprising: (a) the non-linear fluorinated copolymer, in an amount from 0.5 to 5.0% wt, with respect to the total weight (a)+(b)+(c); (b) conductive material, in an amount from 0.5 to 5.0% wt, with respect to the total weight (a)+(b)+(c); (c) active material, in an amount from 90 to 99 wt %.

12. An electrode for lithium ion battery obtained by applying the composition of claim 11 to a metal film to form a coating, and drying the coating.

13. A lithium ion battery having the electrode of claim 12.

14. A non-linear fluorinated copolymer comprising:
at least 87.0 mol % vinylidene fluoride and
from 0.01 to 3.0 mol % of at least one functional comonomer of Formula 1:

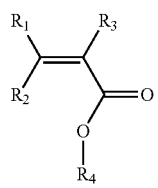

(Formula 1)

wherein each of $R_1$, $R_2$, $R_3$, equal or different from each other, is independently a hydrogen atom or a $C_1$-$C_3$ hydrocarbon group, and $R_4$ is a hydrogen or a $C_1$-$C_{16}$ hydrocarbon moiety comprising at least one hydroxyl group;

and optionally at least one fluorinated ethylenic comonomer, wherein said non-linear fluorinated copolymer contains at least 10 wt % branched architecture and the average primary particle size of the non-linear fluorinated copolymer is greater than 10 microns, and wherein the fraction of randomly distributed functional comonomer is less than 37%.

* * * * *